(12) United States Patent
Pedersoli et al.

(10) Patent No.: US 12,394,105 B2
(45) Date of Patent: Aug. 19, 2025

(54) SYSTEMS AND METHODS FOR GENERATING A VISUAL IMAGE FROM AUDIO DATA, AND SYSTEMS AND METHODS FOR TRAINING THE SAME

(71) Applicants: Fabrizio Pedersoli, Vancouver (CA); Kwang Moo Yi, Vancouver (CA); Dryden Spierings Wiebe, Surrey (CA); Amin Banitalebi Dehkordi, Vancouver (CA); Yong Zhang, Richmond (CA)

(72) Inventors: Fabrizio Pedersoli, Vancouver (CA); Kwang Moo Yi, Vancouver (CA); Dryden Spierings Wiebe, Surrey (CA); Amin Banitalebi Dehkordi, Vancouver (CA); Yong Zhang, Richmond (CA)

(73) Assignees: HUAWEI TECHNOLOGIES CANADA CO., LTD.; THE UNIVERSITY OF BRITISH COLUMBIA, Vancouver (CA)

( * ) Notice: Subject to any disclaimer, the term of this patent is extended or adjusted under 35 U.S.C. 154(b) by 139 days.

(21) Appl. No.: 17/990,371

(22) Filed: Nov. 18, 2022

(65) Prior Publication Data

US 2023/0281886 A1    Sep. 7, 2023

Related U.S. Application Data

(60) Provisional application No. 63/317,414, filed on Mar. 7, 2022.

(51) Int. Cl.
*G06T 11/00* (2006.01)
*G06F 16/683* (2019.01)

(52) U.S. Cl.
CPC ............ *G06T 11/00* (2013.01); *G06F 16/683* (2019.01)

(58) Field of Classification Search
CPC ...................................................... G06F 16/683
See application file for complete search history.

(56) References Cited

U.S. PATENT DOCUMENTS

| | | | |
|---|---|---|---|
| 2003/0191766 A1* | 10/2003 | Elin ........................ | G06F 16/51 707/E17.031 |
| 2006/0015492 A1* | 1/2006 | Keating ............... | G06V 10/507 707/E17.02 |
| 2009/0112800 A1* | 4/2009 | Athsani ................. | G06F 16/951 |
| 2021/0157833 A1* | 5/2021 | Wolkowicz ......... | G06F 16/5846 |
| 2021/0191969 A1* | 6/2021 | Malkosh ............. | G06F 16/5838 |
| 2021/0216817 A1* | 7/2021 | Sommerlade .......... | G06N 3/047 |

OTHER PUBLICATIONS

Brownlee, âGentle Introduction to Vector Norms in Machine LearningââMachine Learning Masteryâ, URL:<<https://machinelearningmastery.com/vector-norms-machine-learning/>>, Oct. 17, 2021 (Year: 2021).*

(Continued)

*Primary Examiner* — Hilina K Demeter

(57) ABSTRACT

Systems and methods for generating a visual image from audio data and for training the same. The method may include: mapping audio data registered with a microphone array onto closest visual representations in a data manifold for latent representation of images of a visual modality; and generating a visual image of the visual modality from the closest visual representations.

18 Claims, 13 Drawing Sheets

(56) References Cited

OTHER PUBLICATIONS

Christensen, Jesper Haahr, Sascha Hornauer, and X. Yu Stella. "Batvision: Learning to see 3d spatial layout with two ears." 2020 IEEE International Conference on Robotics and Automation (ICRA). IEEE (Year: 2020).*
Van Niekerk, Benjamin, Leanne Nortje, and Herman Kamper. "Vector-quantized neural networks for acoustic unit discovery in the zerospeech 2020 challenge." arXiv preprint arXiv:2005.09409 (Year: 2020).*
Van Den Oord, Aaron, and Oriol Vinyals. "Neural discrete representation learning." Advances in neural information processing systems 30 (Year: 2017).*
Vasudevan, Arun Balajee, Dengxin Dai, and Luc Van Gool. "Semantic object prediction and spatial sound super-resolution with binaural sounds." European conference on computer vision. Cham: Springer International Publishing (Year: 2020).*
Chen et al. , "Deep Cross-Modal Audio-Visual Generation", 2017 (Year: 2017).*
Niekerk et al., "Vector-quantized Neural for Acoustic Unit Discovery in the Zerospeech 2020 Challenge" (Year: 2020).*
Christensen et al., "Batvision: Learning to see 3D Spatial Layout with Two Ears" (Year: 2020).*
Oord et al., "Neural Discrete Representation Learning" (Year: 2017).*
Chen et al., "Deep Cross-Modal Audio-Visual Generation" (Year: 2017).*

* cited by examiner

SYSTEMS AND METHODS FOR GENERATING A VISUAL IMAGE FROM AUDIO DATA, AND SYSTEMS AND METHODS FOR TRAINING THE SAME

CROSS-REFERENCE TO RELATED APPLICATIONS

This application claims the benefit of U.S. Provisional Application No. 63/317,414 filed on Mar. 7, 2022, the entire contents of which are incorporated herein by reference.

TECHNICAL FIELD

The present disclosure relates to audio processing, and, in particular, to systems and methods for generating a visual image from audio data, and for training the same.

BACKGROUND

Line-of-Sight is a fundamental requirement of many computer vision algorithms and applications. Most algorithms must have "clear" vision of the entire scene in order to properly work. If this requirement is not met, the algorithms' effectiveness is drastically compromised to a point they cannot be used at all. Computer vision tasks such as object localization and autonomous navigation are particularly affected by the line-of-sight problem. Moreover, when it comes to indoor vision applications, meeting the line-of-sight requirement becomes even more challenging. In indoor situations occluding objects are more likely to be encountered and the layout of the environment can make tasks such as localization or navigation very difficult due to limited vision of the entire scene. On the other hand, potential audio-based methods do not require a direct line-of-sight. For instance, the sound of a dog barking is a reasonable enough cue to infer that a dog is nearby even if it is not visible. Prior works have shown that sounding objects can be localized in space with audio-only techniques by leveraging multi-channel processing using microphone arrays. More recent research works on audio have shown that even more involved audio-based methods can be designed, such as methods that estimate rough visual characteristics of a scene in terms of depth and semantic segmentation. Such audio techniques for extracting visual information are limited to the detection of sounding objects, or require complex instrumentation for estimating the characteristics of indoor scenes.

SUMMARY

The present disclosure describes systems and methods which provide one or more efficient techniques to perform In accordance with a first aspect of the present disclosure, there is provided a computer-implemented method for generating a visual image from audio data, comprising: mapping audio data registered with a microphone array onto closest visual representations in a data manifold for latent representation of images of a visual modality; and generating a visual image of the visual modality from the closest visual representations.

In some or all examples of the first aspect, the data manifold can form part of a vector quantized variational auto-encoder (VQ-VAE) for the visual modality and the generating can comprise generating the visual image using a visual decoder of the VQ-VAE.

In some or all examples of the first aspect, the closest visual representations can be determined in terms of L2 norm.

In some or all examples of the first aspect, the mapping can comprise encoding the audio sample into a domain transformation MLP, and iteratively upsampling output of the domain transformation MLP.

In accordance with a second aspect of the present disclosure, there is provided a computing system for generating a visual images from audio data, the computing system comprising: a processor configured to: map audio data registered with a microphone array onto closest visual representations in a data manifold for latent representation of images of a visual modality; and generate a visual image of the visual modality from the closest visual representations.

In some or all examples of the second aspect, the data manifold can form part of a vector quantized variational auto-encoder (VQ-VAE) for the visual modality and the generating can comprise generating the visual image using a visual decoder of the VQ-VAE.

In some or all examples of the second aspect, the closest visual representations can be determined in terms of L2 norm.

In some or all examples of the second aspect, the processor can be configured to encoding the audio sample into a domain transformation MLP, and iteratively upsample output of the domain transformation MLP.

In accordance with a third aspect of the present disclosure, there is provided a non-transitory machine-readable medium having tangibly stored thereon executable instructions for execution by one or more processors, wherein the executable instructions, in response to execution by the one or more processors, cause the one or more processors to: map audio data registered with a microphone array onto closest visual representations in a data manifold for latent representation of images of a visual modality; and generate a visual image of the visual modality from the closest visual representations.

In accordance with a fourth aspect of the present disclosure, there is provided a method for training an audio-visual transformation network for generating a visual image from audio data, comprising: training a data manifold using a training set of visual images of a visual modality; training a visual decoder for generating a visual image for data coded to the data manifold; and training an audio transformation network for mapping an audio sample to closest visual representations in the data manifold using a training set of audio samples corresponding to the training set of visual images.

In some or all examples of the fourth aspect, the data manifold can be a quantized latent representation of the training set of visual images.

In some or all examples of the fourth aspect, the data manifold can form part of a vector quantized variational auto-encoder (VQ-VAE) for the visual modality and the training of the visual decoder can comprise generating the visual image using a visual decoder of the VQ-VAE.

In some or all examples of the fourth aspect, the closest visual representations can be determined in terms of L2 norm.

In some or all examples of the fourth aspect, the audio transformation network can include an audio encoder for encoding the audio sample into a domain transformation MLP, and a manifold decoder for iteratively upsampling output of the domain transformation MLP.

In some or all examples of the fourth aspect, the manifold decoder can comprise a series of strided transposed convolutional layers that upsample at each stage the output of the domain transformation MLP until a desired manifold size is achieved.

In accordance with a fifth aspect of the present disclosure, there is provided a computing system for generating a visual images from audio data, the computing system comprising: a processor configured to: train a data manifold using a training set of visual images of a visual modality; train a visual decoder for generating a visual image for data coded to the data manifold; and train an audio transformation network for mapping an audio sample to closest visual representations in the data manifold using a training set of audio samples corresponding to the training set of visual images.

In some or all examples of the fifth aspect, the data manifold is a quantized latent representation of the training set of visual images.

In some or all examples of the fifth aspect, the data manifold forms part of a vector quantized variational auto-encoder (VQ-VAE) for the visual modality and the training of the visual decoder comprises generating the visual image using a visual decoder of the VQ-VAE.

In some or all examples of the fifth aspect, the closest visual representations are determined in terms of L2 norm.

In accordance with a sixth aspect of the present disclosure, there is provided a non-transitory machine-readable medium having tangibly stored thereon executable instructions for execution by one or more processors, wherein the executable instructions, in response to execution by the one or more processors, cause the one or more processors to: train a data manifold using a training set of visual images of a visual modality; train a visual decoder for generating a visual image for data coded to the data manifold; and train an audio transformation network for mapping an audio sample to closest visual representations in the data manifold using a training set of audio samples corresponding to the training set of visual images.

In accordance with a seventh aspect of the present disclosure, there is provided a method for training a transformation network for generating data in a first domain from data in a second domain, comprising: training a data manifold using a training set of data in the first domain; training a decoder for generating data in the first domain for data coded to the data manifold; and training a transformation network for mapping data in the second domain to closest representations in the data manifold using a training set of data in the second domain corresponding to the training set of data in the first domain.

Other aspects and features of the present disclosure will become apparent to those of ordinary skill in the art upon review of the following description of specific implementations of the application in conjunction with the accompanying figures.

DETAILED DESCRIPTION OF EXAMPLE EMBODIMENTS

Figure 1:
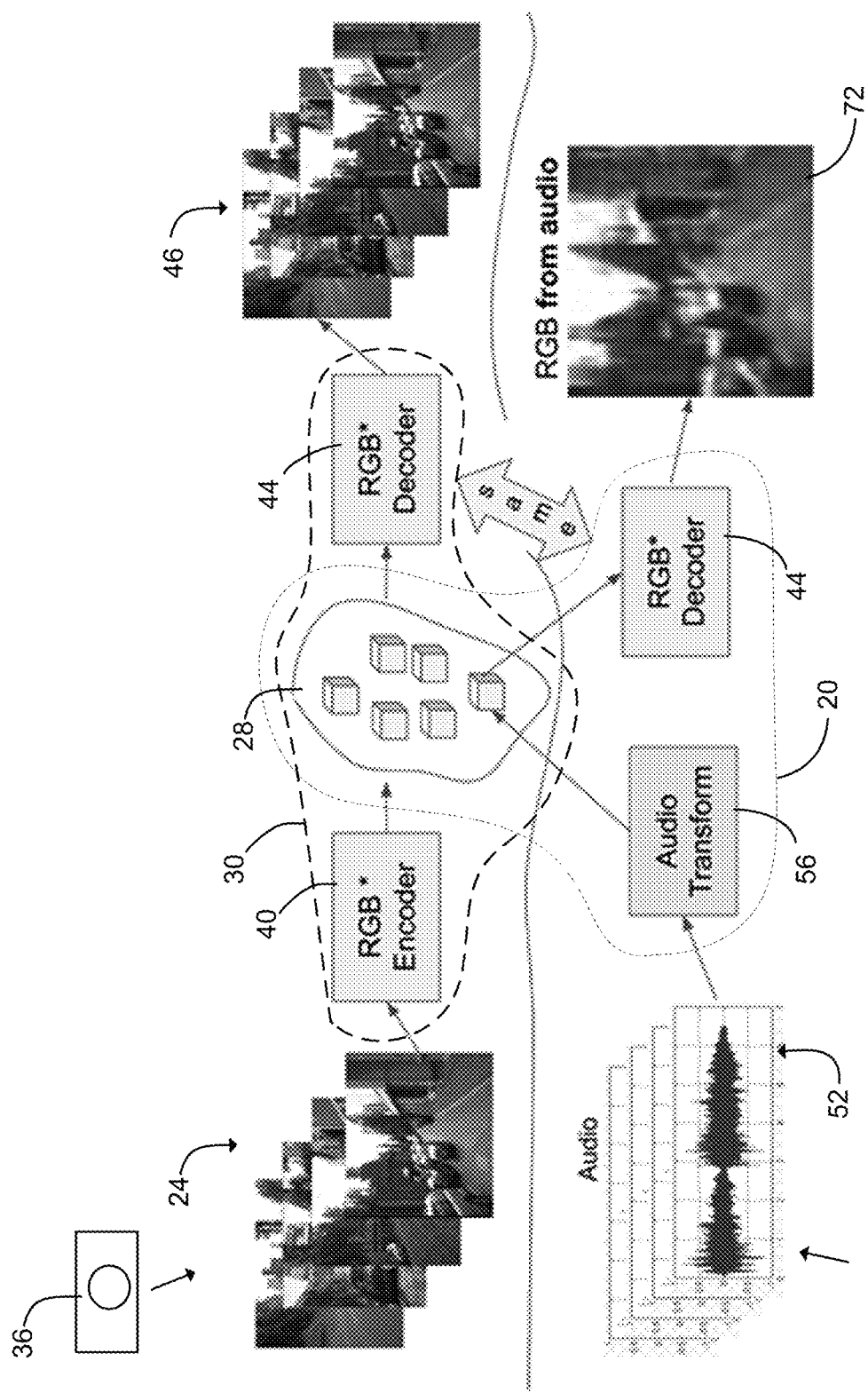
FIG. 1 is a schematic diagram illustrating a method for generating visual images from audio data in accordance with example embodiments described herein.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

Line-of-Sight and privacy are fundamental concerns when it comes to computer vision (CV) applications. For instance, a CV application for autonomous navigation suffers the problem of possible occluding objects or unknown classes. Privacy is also an issue, especially in crowded environments where people's faces can be easily detected. Not only autonomous navigation, but also object localization is affected by this problem when it is applied to real-life situations. Line-of-sight and privacy issues are even more pronounced when the target application is indoors. In this case: occluding objects are most likely to be encountered, and the structure of the indoor environment by itself can make navigation/localization very challenging due to limited vision of the entire scene.

On the other hand, line-of-sight and privacy can be tremendously mitigated by audio based approaches. In fact, locating an object by itself does not require it to be visible. For instance, the sound of a dog barking may be a reasonable enough cue to infer that a dog is nearby even if it is not visible. Moreover, the properties of the received audio signal can indicate with relative precision the spatial location of sounding objects. In addition, since visibility is not required by audio-based applications, privacy is automatically solved thanks to their nature.

By leveraging the properties of perceived sound, audio-based navigation techniques can also be developed. Audio-navigation can be seen as the incremental problem of audio-localization where the goal is to "find-a-way'" to a sounding object. Especially for indoor scenarios, audio can also be used for monitoring purposes. For instance, by exploiting the sound naturally generated by an "actor'" while interacting with a physical environment one could regress its position and/or activity. Such a monitoring system can be used for monitoring the elderly while preserving their privacy.

It is also worth noting that audio based applications are not limited to indoor situations, in fact, the same considerations hold also for outdoor scenarios. Specifically for the outdoors, an even more involved research question arises.

While audio-based localization and navigation have already been investigated, not much research has been done about estimating visual information from audio.

Visual information and visual images, as used herein, refers to data and images that represent information that is visible optically in one of a variety of visual modalities. Visual modalities include, but not limited to, RGB, depth, and semantic segmentation.

The RGB color model or color space is an additive color system in which red, green, and blue primary colors of light are added together to reproduce a range of colors. Other exemplary color spaces include CMYK, HSL, and HSV.

Depth maps are images or image channels that contain information relating to the distance of the surfaces of scene objects from a viewpoint. Typical depth maps represent depth via color luminance and/or hue.

Semantic segmentation is the process and corresponding result of partitioning an image into multiple segments, such as a set of pixels or points. The meaning of each segment is encoded as a label (e.g., text or a number), which is representative of a category that segment belongs to. More specifically, semantic segmentation of images includes prediction of a category (represented by a class label) for one or more points of the image using spatial, color, and intensity information generated by an imaging device, such as a camera from a scene.

It is believed that the environment itself "shapes" in a way such that even higher level visual information can be extracted, besides solving basic tasks such as localization. In fact, it is reasonable to assume that a person walking along a sidewalk in a crowded city street can get a good representation of the visual scene just by listening. In addition, due to the binaural nature of the human auditory system (extended to multi-channel), the perceived sound has sense in the 3D coordinate system.

This consideration is obvious for sounding sources, however visual cues can potentially also be estimated for non-sounding objects, such as the surrounding environment itself. In fact, the sound reflections and absorption properties of different geometries and materials could be exploited for obtaining a rough estimate of the geometry and nature of the environment. With a good amount of audio/video data recorded in the proper conditions, and by using a high quality array of microphones, the estimation of environment geometry/nature should not be considered an unrealistic task.

Many audio and audio-vision algorithms for estimating visual information have been proposed in the past. Early research focused on the problem of sound source localization (SSL) using microphone arrays which often have more than two elements. SSL exploits the different times of arrival of sound at each microphone, as well as the different gain values, to regress the spatial position of the sound source.

For instance, Willert et al., "A probabilistic model for binaural sound localization", IEEE Transactions on Systems, Man, and Cybernetics, Part B (Cybernetics) 36(5), 982-994 (2006), propose the computation of activity maps based on cochlear modelling of binaural audio. The activity maps are frequency/time-delay representations which are used by a probabilistic model to estimate the position (azimuth) given as input reference activity maps at known positions.

Gerstoft et al., "Audio scene monitoring using redundant ad-hoc microphone array networks", IEEE Internet of Things Journal (2021), propose a system for localizing sound sources by using 5-8 circular arrays of microphones. Direction of arrival was computed for each array and then fed to a processing method, which is either based on PCA or affine transformation.

Valin et al., "Robust sound source localization using a microphone array on a mobile robot", Proceedings 2003 IEEE/RSJ International Conference on Intelligent Robots and Systems (IROS 2003)(Cat. No. 03CH37453). vol. 2, pp. 1228-1233. IEEE (2003), present a method for sound source localization in 3D space using an array of 8 microphones. Their method is based on time delay of arrival estimation and can work in real-time.

Otsuka et al., "Bayesian nonparametrics for microphone array processing", IEEE/ACM Transactions on Audio, Speech, and Language Processing 22(2), 493-504 (2013), present a unified framework for sound source localization and source separation which is jointly optimized and based on Bayesian nonparametrics.

Yalta et al., "Sound source localization using deep learning models", Journal of Robotics and Mechatronics 29(1), 37-48 (2017), propose the use of deep neural network to localize sound sources using a microphone array.

All of the above approaches require controlled environments, and can only estimate the position of the sounding object as a coordinate in space.

More recent work has used audio jointly with vision in order to identify peculiar regions within an image based on sound characteristics.

For example, Senocak et al., "Learning to localize sound source in visual scenes", Proceedings of the IEEE Conference on Computer Vision and Pattern Recognition, pp. 4358-4366 (2018), propose a two stream Convolutional Neural Network (CNN) to perform sound localization in an unsupervised manner. The output of the CNN is processed by an attention module which combines the audio and vision stream.

Aytar et al., "Learning sound representations from unlabeled video", Advances in neural information processing systems 29 (2016), present a deep architecture for learning sound representations from unlabelled data. The inherent correlation of sound and vision in a video, allowed the training in a student teacher setting a model that yields good performance for acoustic/object classification.

Arandjelović et al., "Objects that sound" Proceedings of the European conference on computer vision (ECCV), pp. 435-451 (2018), propose a method for locating sounding objects in images given the audio signal. In particular, a two stream network is used which is trained with the objective of audio and video correspondence.

In a similar way, by leveraging large amounts of unlabelled data in an unsupervised learning setting, Zhao et al., "The sound of pixels", Proceedings of the European conference on computer vision (ECCV), pp. 570-586 (2018), present a method for locating sounding regions within an image. The proposed method is jointly audio-visual and is capable of separating sound sources, and mapping them to their corresponding pixel locations. As an extension of their previous work, Zhao et al., "The sound of motions", Proceedings of the IEEE/CVF International Conference on Computer Vision, pp. 1735-1744 (2019), inspired by the fact that sound is generated by the motion of objects and vibrations, propose a deep learning system capable of extracting motion cues for the task of sound source localization and separation. By using unlabelled audio/video data the authors train end-to-end a deep model in a curriculum learning setting. Their model is composed of: motion network, appearance network, and sound source separation network; where audio and visual streams are interconnected with an attention-like module.

These works, use audio as an additional source of information for detecting peculiar regions with the image based on characteristics of sound.

A new emerging and challenging research direction is to develop methods capable of extracting visual information from audio only. Inspired by echolocation in animals, Christensen et al., "Learning to see 3d spatial layout with two ears", 2020 IEEE International Conference on Robotics and Automation (ICRA), pp. 1581-1587. IEEE (2020), proposed a system for estimating depth maps and grayscale images of indoor scenes using a radar-like approach. Their system is composed of a binaural microphone, a speaker, and a ZED camera mounted on a small moving agent. The agent emits small chirp signals and the returning echoes are modelled by a deep network to reconstruct depth or grayscale images using the camera image as ground-truth.

Ire et al., "Seeing through sounds: Predicting visual semantic segmentation results from multichannel audio signals", ICASSP 2019-2019 IEEE International Conference on Acoustics, Speech and Signal Processing (ICASSP), pp. 3961-3964. IEEE (2019), propose a method for predicting semantic segmentation of human bodies in a controlled environment from multichannel audio. Angular spectrum and MFCCs (Mel Frequency Cepstrum Coefficient) are extracted from the audio and fed to a two stream convolutional encoder. After a fusion layer, a convolutional decoder is used for predicting the segmentation map.

Lin et al., "Unsupervised sound localization via iterative contrastive learning", arXiv preprint arXiv:2104.00315 (2021), present an unsupervised method for identifying sounding pixels in images by using a contrastive learning framework. Their method is iterative, at first they learn the correlation between audio and visual signals (within the same audio/visual pair) which are then used as pseudo-labels for the subsequent step. In the next step they learn the audio/visual correspondence across different videos which allows to refine the detection of sounding pixels.

Valverde et al., "There is more than meets the eye: Self-supervised multi-object detection and tracking with sound by distilling multimodal knowledge", Proceedings of the IEEE/CVF Conference on Computer Vision and Pattern Recognition, pp. 11612-11621 (2021)", propose a self-supervised framework for detecting cars bounding boxes from sound by using a student-teacher approach.

A student-teacher approach is also used in the work of Vasudevan et al., "Semantic object prediction and spatial sound super-resolution with binaural sounds", European conference on computer vision, pp. 638-655, Springer (2020). By using an encoder-decoder architecture they predict segmentation maps of sounding objects (car, train, motorcycle), as well as, depth maps, and audio super-resolution.

The previously described works for estimating visual information has some limitations including the complexity and instrumentation required for setup or the estimation of a small portion of what it would be entire visual scene.

The present disclosure describes example embodiments of methods, systems, and computer-readable media for training and using an audio-visual transformation network for generating visual images from audio data.

Proposed herein is a two-stage method for training an audio-visual transformation network. Given an audio/video pair, the audio-visual transformation network learns to transform an audio sample to its corresponding frame visual modality by using its encoded (latent) representation. An audio/video pair can be, for example, a small segment of audio, typically 1 or 2 seconds, and its corresponding frame of the desired visual modality (i.e., the visual image).

At first, a vector-quantized variational auto-encoder (VQ-VAE) is trained on each of a set of desired visual modalities in order to learn the manifold data for each. During training of the VQ-VAE, a visual encoder for encoding visual images to the data manifold and a visual decoder for decoding visual images from the data manifold are also trained. Once the data manifold for each of the visual modalities is learned, an audio transformation network (AT-net) is trained. The purpose of the AT-net is to encode an audio sample into latent representations which are "close", in terms of L2 norm, to the corresponding visual sample in its latent space (not quantized). The transformed latent code is then quantized and passed through the visual decoder developed during training of the VQ-VAE to get a visual reconstruction.

An exemplary general method in accordance with some embodiments will now be described with reference to FIGS. 1 and 2A. A training set of visual image data 24 is used to learn a data manifold 28 in a VQ-VAE 30 for a particular desired visual modality. The training set of visual image data 24 includes a training set of visual images 32 captured using a visual image capture device 36. The desired visual modalities can be, for example, RGB, depth maps, and semantic segmentation maps. The training set of visual image data can be single images or portions thereof, sequences of images (e.g., video), etc.

As used herein, the term "data manifold" means an encoded representation of a desired modality (e.g., visual) which lies in a lower dimensional space with respect to the original data size.

The visual image capture device 36 can be any suitable device for capturing visual images, such as a digital camera or any other suitable means for registering images in one or more visual modalities. For example, the visual image capture device 36 can include a LIDAR device that captures depth information that can then be used to generate a visual image. During the training of the data manifold 28, a visual encoder 40 and a visual decoder 44 are generated, enabling the training set of visual images 32 to be encoded into and decoded from the data manifold 28. The data manifold 28 is a quantized latent representation of the dataset samples. The visual decoder 44 enables reconstruction of the data sample in the selected visual domain. Once the data manifold 28 is trained, it does not change in accordance with some embodiments herein.

Then, a training set of audio data 52 is used to train a domain transformation network, also referred to as an audio transformation network (AT-net) 56. The training set of audio data 52 includes a training set of audio samples 60. Each audio sample in the training set corresponds to one of the visual images 32. The audio samples 60 are captured using a microphone array 64 or two or more microphones at the same general viewpoint as the visual image capture device 36 at which the corresponding visual image 32 is captured. Accordingly, the audio samples are multichannel audio samples. Preferably, each audio sample 60 is captured generally simultaneously with the corresponding visual image 32 to form an audio/visual pair 68, but may also be captured a period of time before or after the corresponding visual image, depending on how static the content being registered is.

As used herein, a viewpoint is a position or perspective from which visual and audio data is registered for a scene.

The training set of audio data 52 can be any audio samples registered via a microphone array or microphone arrays that are sufficiently long to capture sound as it is received from various elements of scenes or representations thereof. As will be understood, the audio sampled by a microphone array will generally have a number of channels corresponding to the number of microphones in the microphone array.

The training set of visual image data 24 and the training set of audio data 52 are stored in a training database 72.

The AT-net 56 maps each audio sample 60 in the training set of audio data 52 onto the closest visual representation in the data manifold 28 (i.e., in visual latent space) used as a ground truth for latent representation of visual data samples, such as visual images. The mapped audio data is then used to generate a visual image using the visual decoder 44 of the VQ-VAE 30. Thus, an audio-visual transformation network 20 for generating a visual image from audio data in this embodiment includes the AT-net 56, the data manifold 28, and the visual decoder 44.

This two-stage approach provides advantages compared to single-stage (end-to-end) approaches. End-to-end models have limitations when used to extract visual information from audio signals. It has been empirically observed that such models converge to an average representation of the data set that has low quality and lacks visual detail. Moreover, the average quality of prediction is generally not satisfactory. A two-stage approach can overcome these issues by learning a transformation at the manifold level. The key idea of learning a transformation at the manifold level is that it potentially allows for the reconstruction of the overall structure, as well as the details, of a visual modality as the visual decoder 44 is specific to that modality. This transformation can be effectively learned because manifold data lies in a higher-dimensional space, which enforces sparsity and thus is less affected by the "regression to the mean" representation problem since features are high dimensional and there is low spatial redundancy.

Figure 2A:
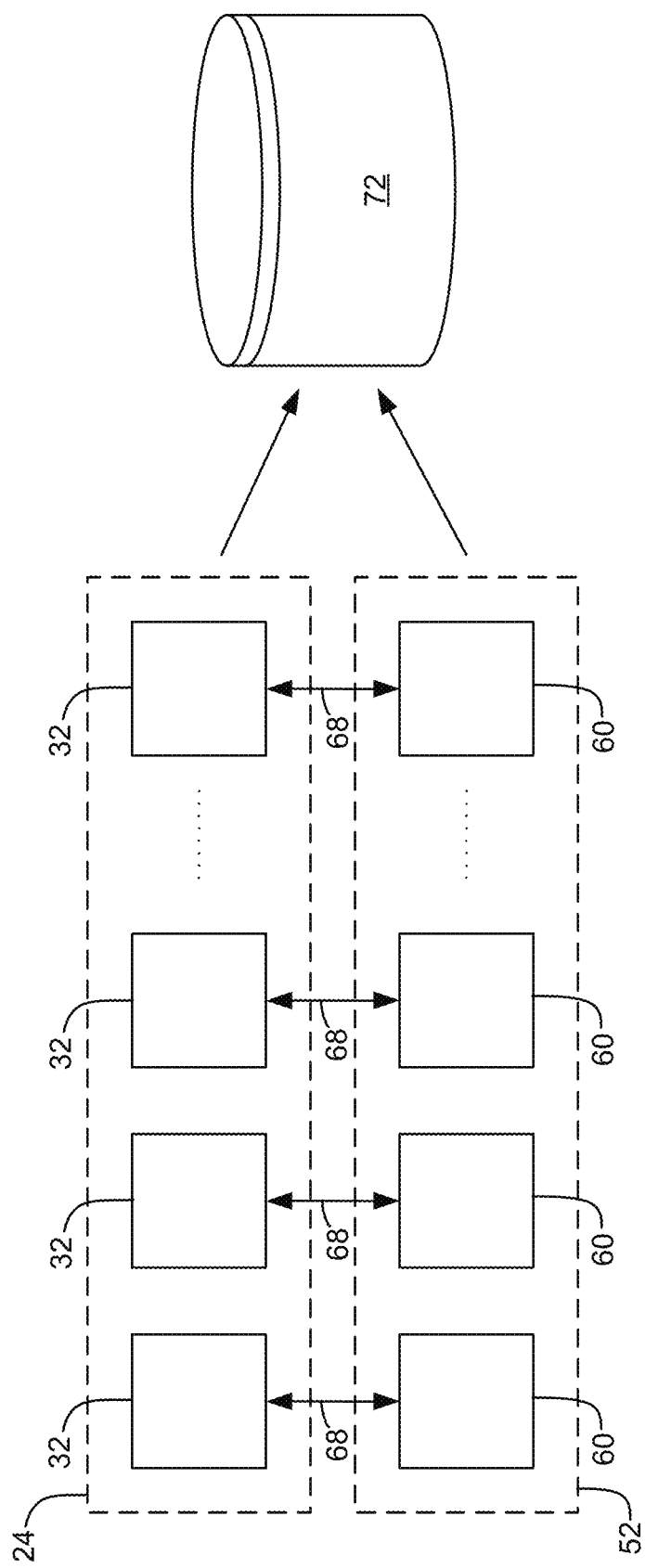
FIG. 2A is a schematic diagram showing training data stored in a training database for training an audio-visual transformation network for generating visual images from audio data in accordance with example embodiments described herein.
Figure 2B:
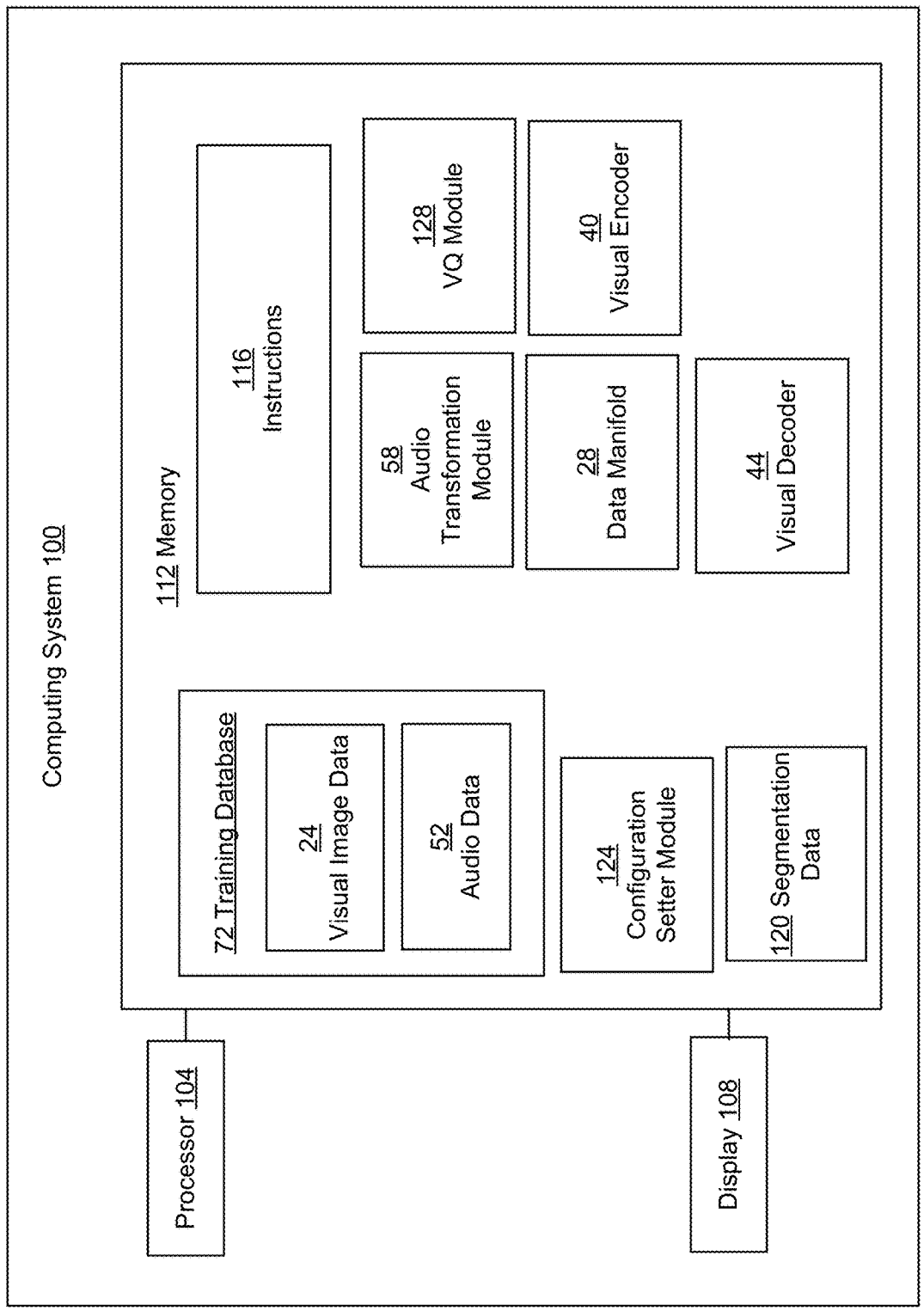
FIG. 2B is a schematic diagram showing various physical and logical components of a computing system for training and using an audio-visual transformation network for generating visual images from audio data in accordance with some example embodiments described herein.

FIG. 2B shows various physical and logical components of an exemplary computing system 100 for training and using the audio-visual transformation network 20 for generating visual images from audio data in accordance with an embodiment of the present disclosure. Although an example embodiment of the computing system 100 is shown and discussed below, other embodiments may be used to implement examples disclosed herein, which may include components different from those shown. Although FIG. 2B shows a single instance of each component of the computing system 100, there may be multiple instances of each component shown. The example computing system 100 may be part of, or connected to, a device for monitoring systems for the elderly to provide a visual representation of the location of a person for which line-of-sight may not be available, such as in an indoor environment. Alternatively, the example computing system 100 may be part of, or connected to, a simultaneous localization and mapping (SLAM) system, such as for autonomous vehicles.

The computing system 100 includes one or more processors 104, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 104 may collectively be referred to as a processor 104. The computing system 100 may include a display 108 for outputting data and/or information in some applications, but may not in some other applications.

The computing system 100 includes one or more memories 112 (collectively referred to as "memory 112"), which may include a volatile or non-volatile memory (e.g., a flash memory, a random access memory (RAM), and/or a read-only memory (ROM)). The non-transitory memory 112 may store machine-executable instructions for execution by the processor 104. A set of machine-executable instructions 116 defining a training and application process for the audio-visual transformation network 20 for generating visual images from audio data (described herein) is shown stored in the memory 112, which may be executed by the processor 104 to perform the steps of the methods for training and using the audio-visual transformation network 20 to generate visual images from audio data and generating visual data from audio data described herein. The memory 112 may include other machine-executable instructions for execution by the processor 104, such as machine-executable instructions for implementing an operating system and other applications or functions.

The memory 112 stores the training database 72 that includes the training set of visual image data 24 and the training set of audio data 52 used to train the audio-visual transformation network 20 to generate visual images from audio data as described herein.

The memory 208 may also store other data, information, rules, policies, and machine-executable instructions described herein, including segmentation data 120 generated and/or used during the process of semantic segmentation of visual images. Segmentation data 120 may include, for example, a refined labelled image generated by one or more machine learning models or networks stored in instructions 220, and a set of refined labels associated with the refined labelled image.

In some examples, the computing system 100 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 112 to implement data storage, retrieval, and caching functions of the computing system 100.

The components of the computing system 100 may communicate with each other via a bus, for example. In some embodiments, the computing system 100 is a distributed computing system and may include multiple computing devices in communication with each other over a network, as well as optionally one or more additional components. The various operations described herein may be performed by different computing devices of a distributed system in some embodiments. In some embodiments, the computing system 100 is a virtual machine provided by a cloud computing platform.

A VQ module 128 manages the learning of the VQ-VAE.

Although the components for both training and using the audio-visual transformation network 20 are shown as part of the computing system 100, it will be understood that separate computing devices can be used for training and using the audio-visual transformation network 20 for generating visual images from audio data.

Figure 3:
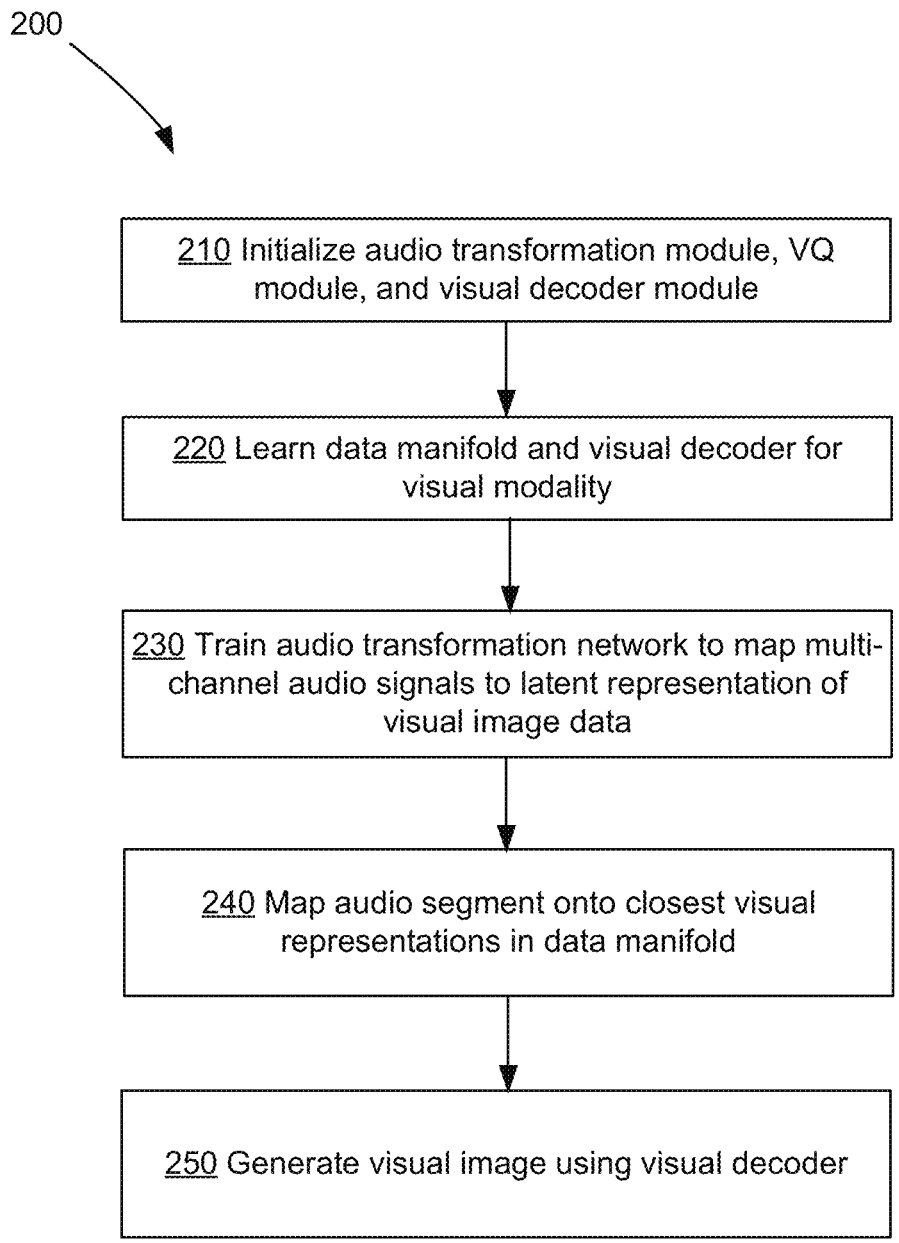
FIG. 3 is a flowchart of a general method of training and using an audio-visual transformation network for generating visual images from audio data performed by a computing system in accordance with example embodiments described herein.

Now with reference to FIGS. 1 to 3, a method 200 of training an audio-visual transformation network for generating a visual image from audio data is shown.

Figure 4:
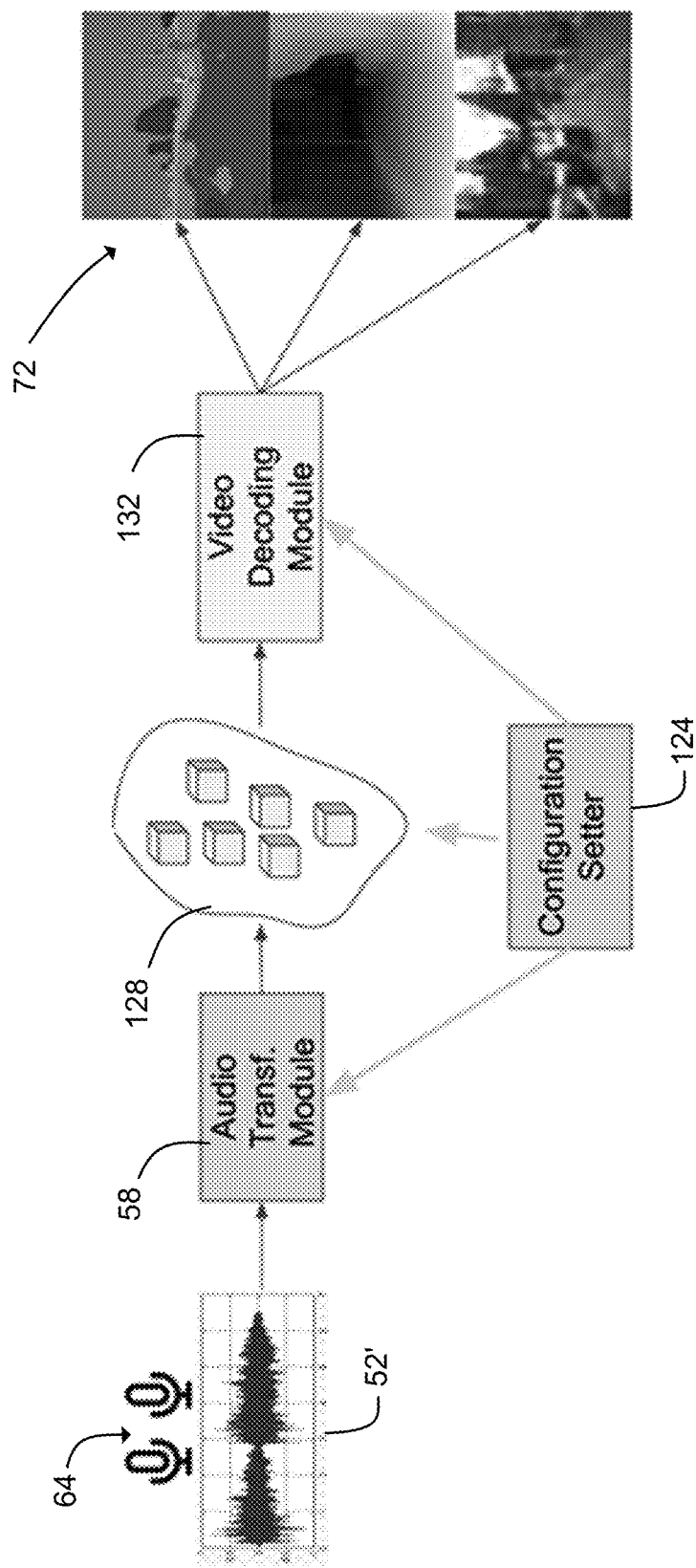
FIG. 4 is a schematic diagram of the configuration setter module (CSM) used to initialize various components of the computing system shown in FIG. 2B.

The method 200 commences with the initialization of the audio transformation module 58, a VQ module 128, and the visual decoder module 132 (210). The model deployment is done by a configuration setter module (CSM) 124 as shown in FIG. 4. The CSM 124 initializes the audio transformation module 58, the VQ module 128, and the visual decoder module 44 by setting their operational parameters. The audio transformation module 58 maps audio data to the data manifold 28 learned by the VQ-VAE 30. Specifically, the CSM 124 sets the parameters of spectrogram computation, such as parameters for mapping raw audio to spectrogram (e.g., fft-length frame size, window size and type, and window overlap). With respect to the VQ module 128, the CSM 124 sets the number of code-words, the code-words dimensionality, and the latent space size. Finally, the CSM 124 sets the visual decoder module 44 into the desired modality.

Referring again to FIGS. 1 to 3, next, a data manifold 28 is learned for a visual modality (220). This is referenced as VQ-VAE pre-training. A VQ-VAE is used for learning the data manifold 28 of each of a set of given visual modalities. In the particular illustrated and described example, the visual modalities are depth maps and segmentation maps.

Figure 5:
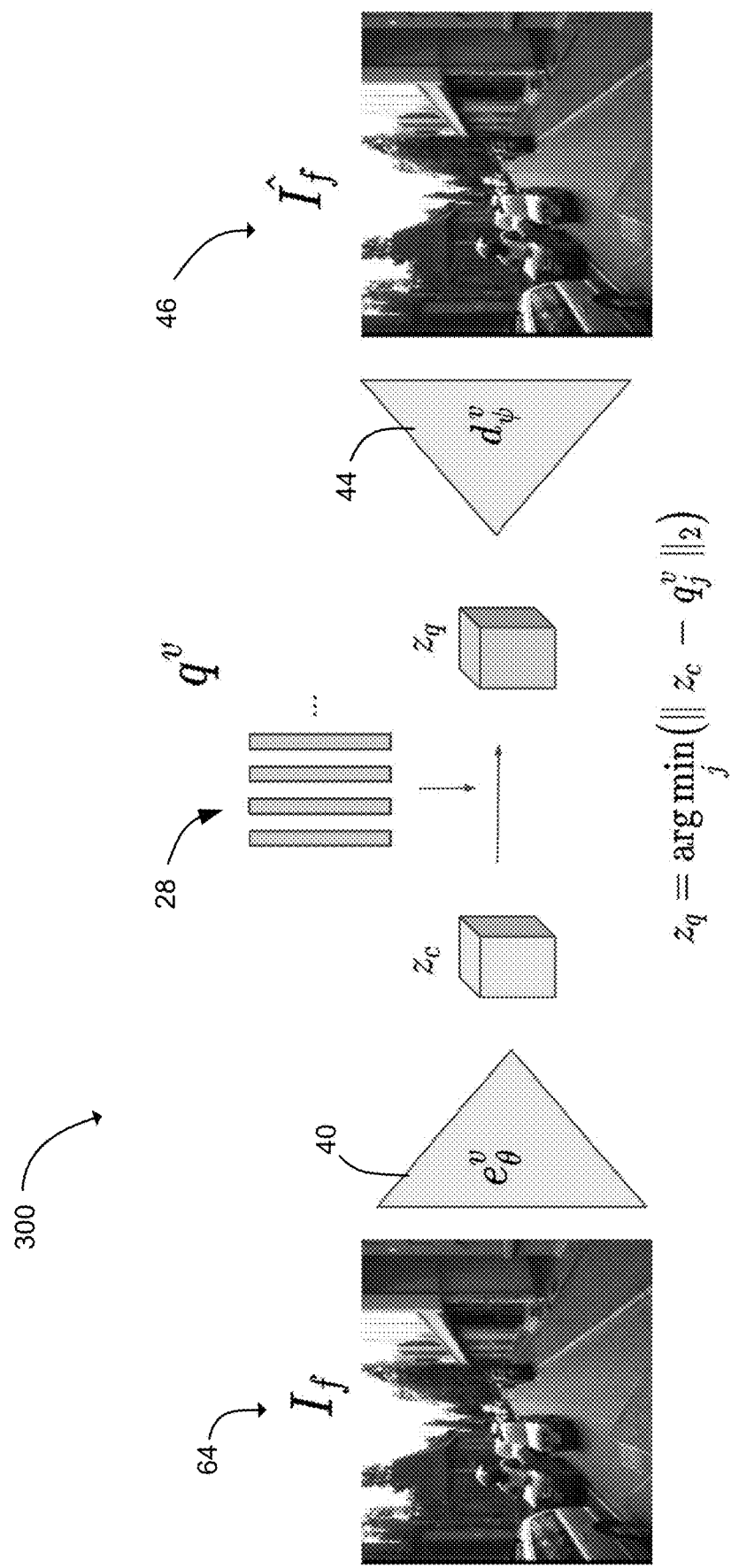
FIG. 5 is a schematic diagram illustrating an example VQ-VAE framework for the encoding and decoding of visual images to and from a data manifold in accordance with some example embodiments described herein.

FIG. 5 shows an overview of a VQ-VAE framework 300, hereinafter referred to alternatively as a VQ-VAE. The main idea behind the VQ-VAE 300 is to introduce a trainable vector quantizer at a latent space (manifold). For the visual modality RGB, mathematically, the VQ-VAE 300 converts an image $I_f$ into latent code z via a visual encoder in the form of an RGB encoder 40 $z = e^v(I_f)$, which can then be decoded back into a reconstructed image $\hat{I}_f$ via a visual decoder in the form of an RGB decoder 44 $d^v$ after quantization, that is, $\hat{I}_f = d^v([e^v(I_f)]_q)$, where $[\ ]_q$ denotes quantization. Here, the parameters of the RGB encoder 40' and the RGB decoder 44' $\theta, \psi$ are omitted for simplicity. While this is explained in relation to RGB, it can also apply to any other visual modality.

VQ-VAEs have been shown to not have any particular limitation in reconstruction compared to traditional VAEs, while simplifying the latent representation of data samples.

It is noted that data generation (sampling) is not important here. The VQ-VAE 300 is used to obtain a quantized representation of latent data; i.e., a manifold which is discretized and more controllable. For this kind of application, since a VQ-VAE 300 is trained for each one of the visual modalities, an accurate reconstruction can be obtained by just using a small number of code-words (e.g., 64). The amount of detail preserved in reconstruction depends on the resolution of the latent representation. The smaller the latent resolution is, the less detailed (i.e., more blurry) the reconstruction will be. Choosing an appropriate latent resolution is a key design choice for the overall system.

The training objective for the VQ-VAE 300 is the reconstruction loss and the vector quantization loss. Learning the data manifold is a key part of the system because the way audio is decoded to the respective visual modality relies on that. In fact, the same (pre-trained) visual decoder is used during prediction.

A VQ-VAE is used because it is more robust for decoding from audio. In addition, the constrained manifold representation allows for easier training of the AT-net 56. "Robustness" here refers to how much error can be tolerate from the audio transformation. Indeed, via vector quantization, different feature vectors which are close in terms of L2 norm will be mapped to the same manifold code-word, and therefore decoded with no difference at the final output. This means that potential errors during audio transformation will be recovered by quantization.

For the VQ-VAE 300, a similar configuration as the one proposed by Van Den Oord et al., "Neural discrete representation learning", Advances in neural information processing systems 30 (2017). The visual encoder 40 and the visual decoder 44 are characterized by simple strided convolutional layers with ReLU activations. The number of features for the first convolutional layer, both at the encoder side and decoder side, is set to 64. All the remaining convolutional layers have 128 features. Note that each convolutional layer is strided; i.e., it downsamples (encoder) or upsamples (decoder) its input by a factor of 2. A sequence of three residual convolutional blocks is placed before and after the vector quantization module. The residual blocks do not change their input size. The vector quantizer is configured to have 64 code-words of dimensionality 64. The number of strided convolutions of the visual encoder 40 and the visual decoder 44 is chosen in order to match the desired size of the data manifold 28: 8×8, 16×16, and 32×32 in experiments.

The VQ-VAE framework 300 is independently trained for each visual modality. It has been determined that the principal factor for obtaining detailed reconstruction of the data of a visual image is the higher resolution of the latent space. On the other hand, smaller resolutions of the latent space yield progressively more blurry reconstructions. It is important to note that the latent space resolution is a fundamental design choice of the overall method. In fact, the AT-net 56 entirely relies on this data for learning to map audio data to visual information; the resolution size determines how effectively this transformation can be learned. Learning this transformation is not an easy task, and the VQ-VAE framework 300 is relied upon for making this process more effective. In fact, the quantized nature of the VQ-VAE framework 300 allows the model to better tolerate small "errors" in transformation since they will be eliminated by the quantization process. Finally, it is noted that any sort of data generation (sampling) is not employed.

Referring again to FIG. 3, after the data manifold is learned for each of the selected visual modalities at 220, the AT-net 56 is trained to map multi-channel audio samples to the latent representation of the visual image data (i.e., the data manifold) (230). This is performed for each desired visual modality.

Figure 6:
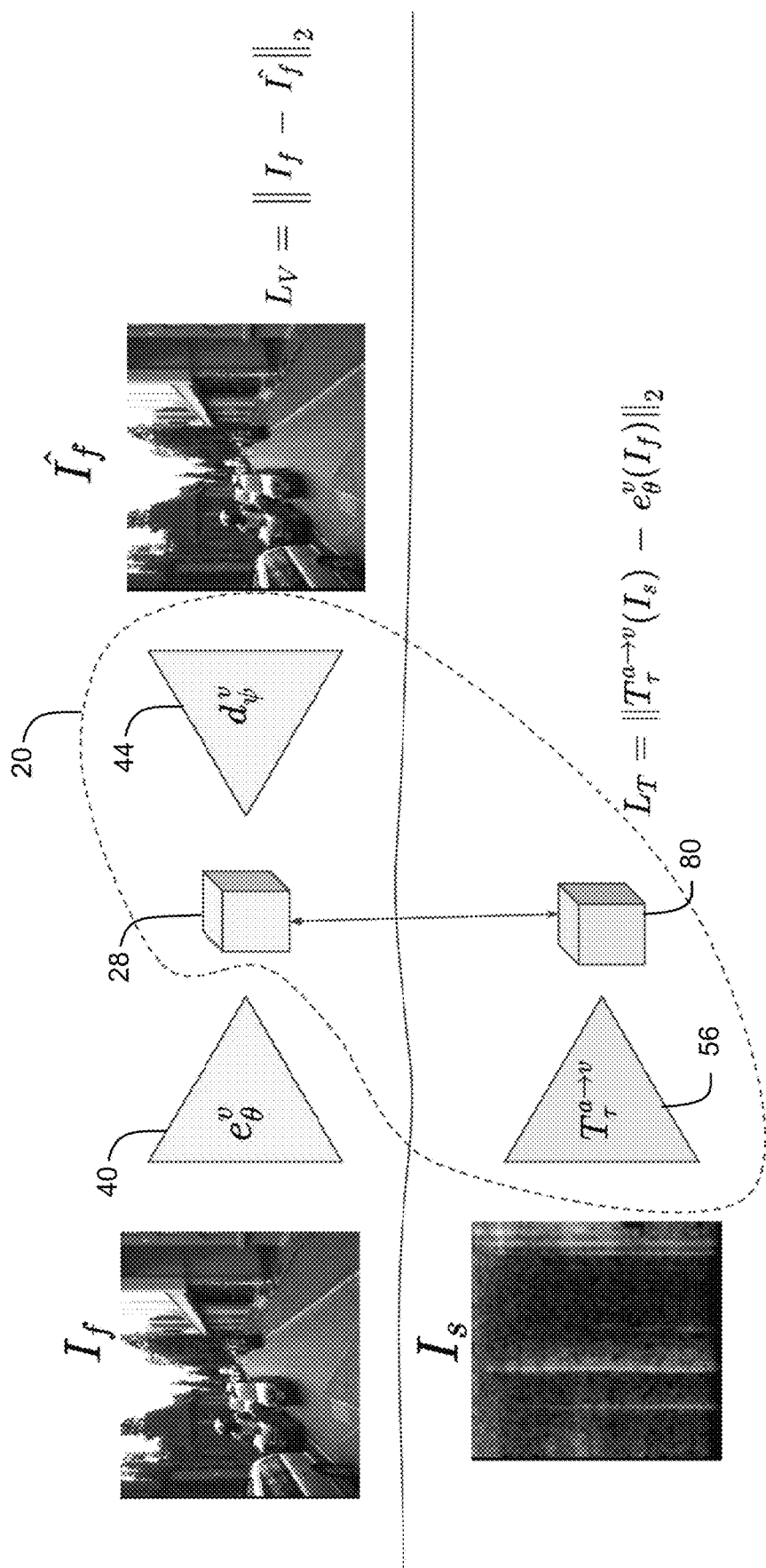
FIG. 6 is a schematic diagram illustrating various components of an audio-visual transformation network being trained to map audio data onto the data manifold of the VQ-VAE of FIG. 5 in accordance with some example embodiments described herein.

The purpose of the AT-net 56 is to encode an audio (spectrogram) sample to a manifold sample in an audio data manifold 80 which is as close as possible with respect to the corresponding visual manifold sample, as shown in FIG. 6. Since the decoding process to the visual modality uses the pre-trained visual decoder 44, the performance of the AT-net 56 has a significant impact on the overall performance of the system. Therefore, the architecture of the AT-net 56 is chosen carefully.

Once the AT-net 56 has been trained, it can then be used to map an audio sample onto the closest visual representations in the data manifold 28 (240). Once the audio sample is mapped onto the closest visual representations in the data manifold 28, application of the visual decoder 44 generates a visual image (250).

Figure 7:
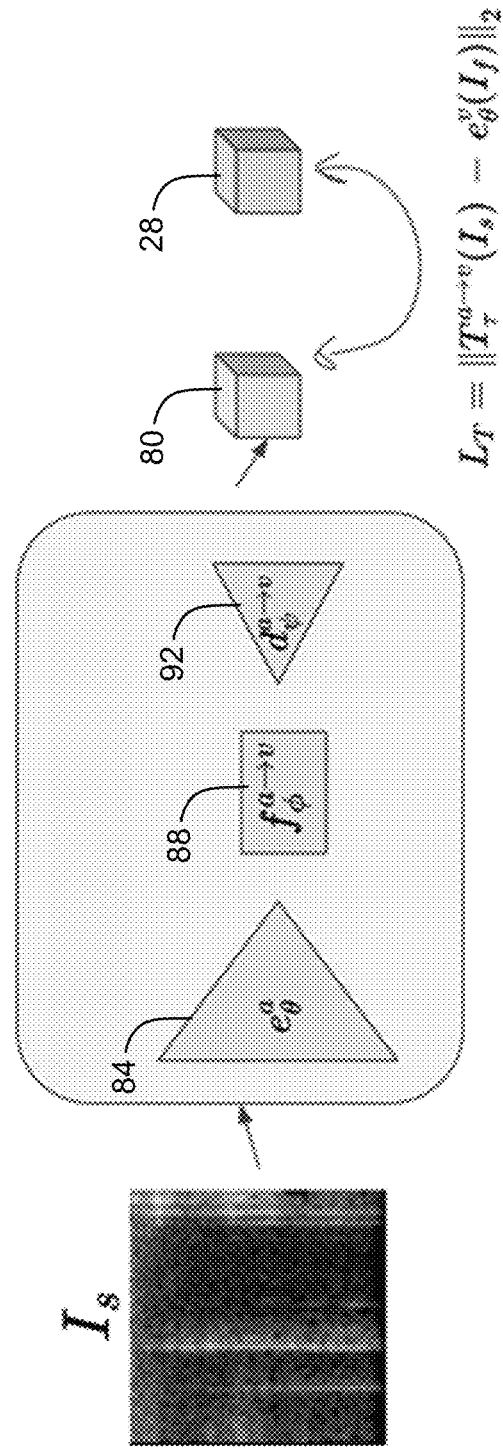
FIG. 7 is a schematic diagram illustrating an audio transformation network for encoding an audio sample to a manifold sample that is as close as possible to a corresponding visual manifold sample in accordance with some example embodiments described herein.

Now referring to FIG. 7, the AT-net 56 consists of three components: an audio encoder 84, a domain transformation MLP 88, and a visual manifold decoder 92. Specifically, the audio encoder 84 is a Resnet 18, as described in He et al., "Deep residual learning for image recognition", Proceedings of the IEEE conference on computer vision and pattern recognition, 2016. The domain transformation MLP 88 consists of a sequence of three dense layers with dropout probability of p=0.2 and ReLU activations. The visual manifold decoder 92 consists of series of strided transposed convolutional layers which upsamples at each stage the output of the domain transformation MLP 88 by a factor of 2 until the desired manifold size is reached; the number of features is halved at each stage.

Mathematically, the AT-net 56 translates an audio signal $I_s$, represented as a spectrogram, into the data manifold 28 that is learned during training of the VQ-VAE 300 via an audio encoder 84 $e^a$, followed by a domain transformation MLP 88 $f^{a \rightarrow v}$ and the visual manifold decoder 92. This is then decoded into the desired modality (e.g., RGB) via the visual decoder 44 $d^{a \rightarrow v}$, which is identical to the already trained visual decoder 44 generated during training of the VQ-VAE 300 (and is thus referenced using the same numeral), that is, $d^{a \rightarrow v} = d^v$. In other words, to reconstruct an image from audio, $d^v(f^{a \rightarrow v}(e^a(I_s)))$ is performed, or $d^v(T^{a \rightarrow v}(I_s))$ for a shorthand representation.

Figure 8:
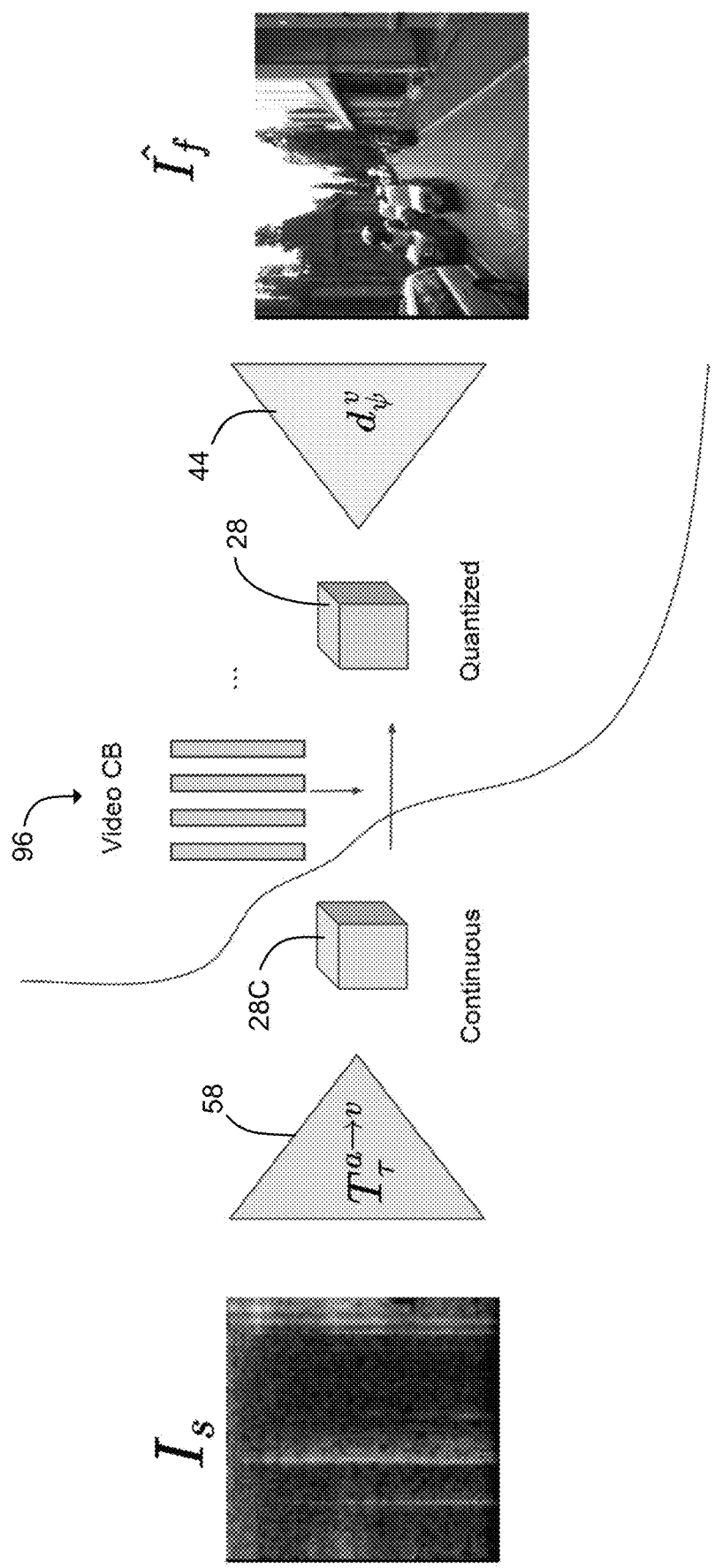
FIG. 8 is a schematic diagram illustrating an audio-visual transformation network with the manifold code-book and the visual decoder of a VQ-VAE run in cascade for predicting visual information from audio data in accordance with some example embodiments.

FIG. 8 is a schematic diagram showing the AT-net 56 of FIG. 7 with a manifold code-book 96 and the visual decoder 44 of the VQ-VAE 300 run in cascade for predicting visual information from audio data in accordance with some example embodiments. The AT-net 56 is trained with L2 loss at manifold data, that is $\|T_a \rightarrow v(I_s) - ev(I_f)\|$. Note that the AT-net 56 is trained on the continuous (not quantized) latent representation 28C of the visual data. Also in this case, the resolution of the data manifold 28 plays an important role. Indeed, the difficulty in training the AT-net 56 heavily depends on how big or small the latent resolution is. A small resolution yields easier training but more blurry reconstruction. On the other hand, a bigger resolution could potentially ensure more detailed reconstruction, but the training process of the AT-net 56 would be more problematic. Thus, preferably, the latent space resolution is a parameter that is selectively chosen and benefits from empirical evaluation based on the application.

Sample outputs were generated using the above-described method of generating visual images from audio data. For purposes of testing, the following parameters were selected:

input image resolution: 256×256

VQ specification: manifold size 32×32, dimension 64, num 64

Dataset:
  ETH (parked car): eight-channel audio, RGB, depth, segmentation
  parked car makes the problem even more difficult (huge bias to background)

Figure 9:
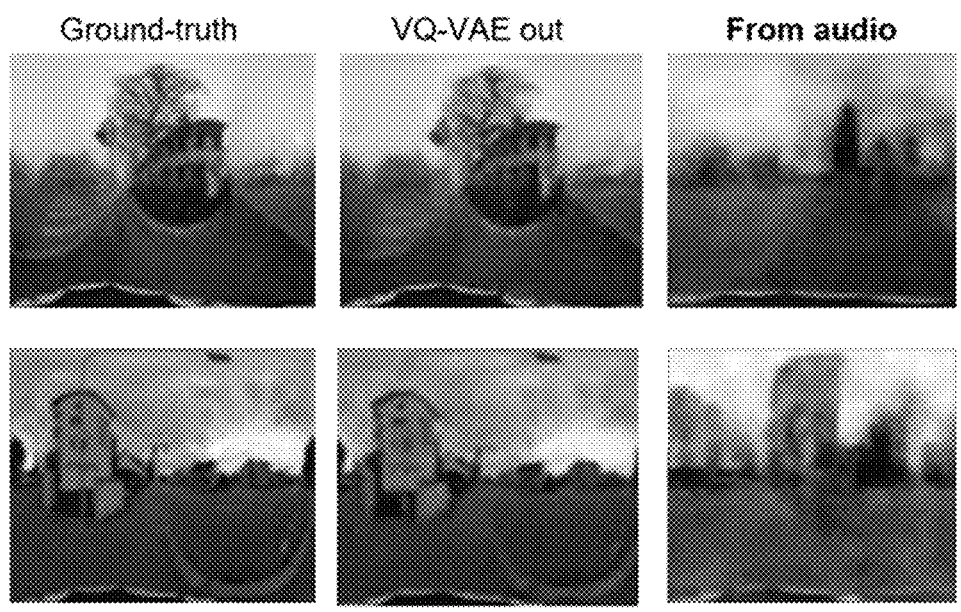
FIG. 9 shows two example ground-truth RGB images and two generated RGB images from a VQ-VAE and from an audio-visual transformation network in accordance with some example embodiments.

FIG. 9 shows the ground-truth frame, the VQ-VAE output (i.e., the upper-bound optimal prediction from video that may be ever possible from audio), and the extracted visual information from the audio data. The RGB from audio frames reflects the actual visual content of the scene to a degree.

Figure 10:
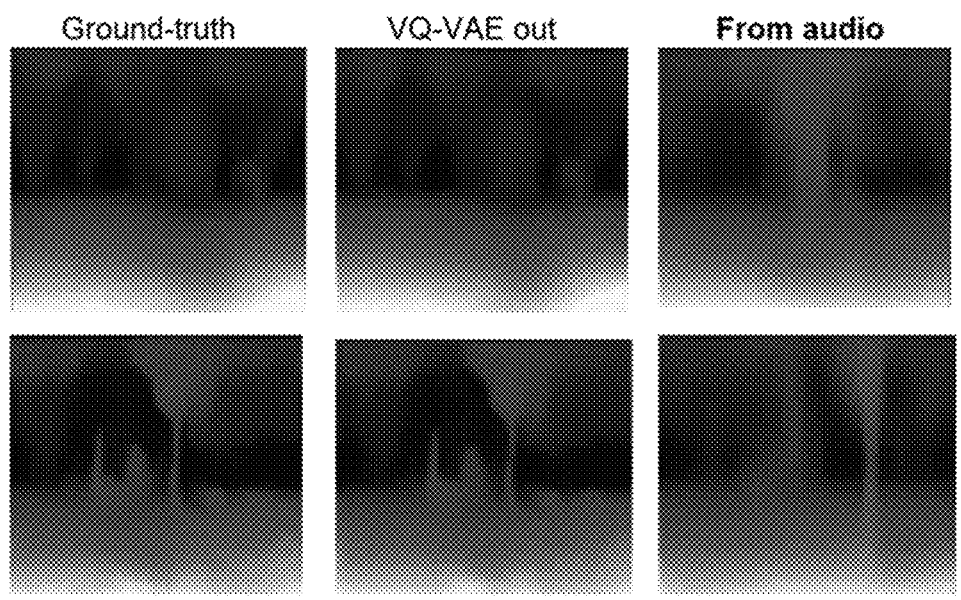
FIG. 10 shows two example ground-truth depth images and two generated depth images from a VQ-VAE and from an audio-visual transformation network in accordance with some example embodiments.

FIG. 10 shows the corresponding depth map frames for the same visual images and audio data used to generate the visual images of FIG. 9. Again, it can be seen that the depth maps generated from the audio data is inline with the actual ground-truth depth maps.

Figure 11:
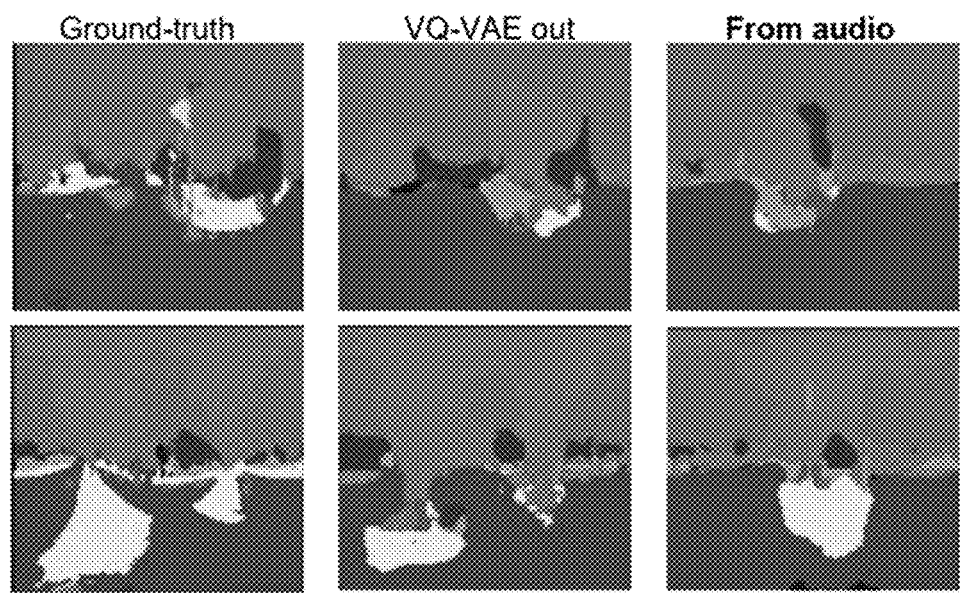
FIG. 11 shows two example ground-truth semantic segmentation images and two generated semantic segmentation images from a VQ-VAE and from an audio-visual transformation network in accordance with some example embodiments.

FIG. 11 shows the corresponding semantic segmentation map frames for the same visual images and audio data used to generate the visual images of FIGS. 9 and 10. The semantic segmentation maps generated from the audio data are surprisingly accurate in comparison to the actual ground-truth semantic segmentation maps, indicating that audio data can be used to segment out and distinguish scene objects.

Figure 12:
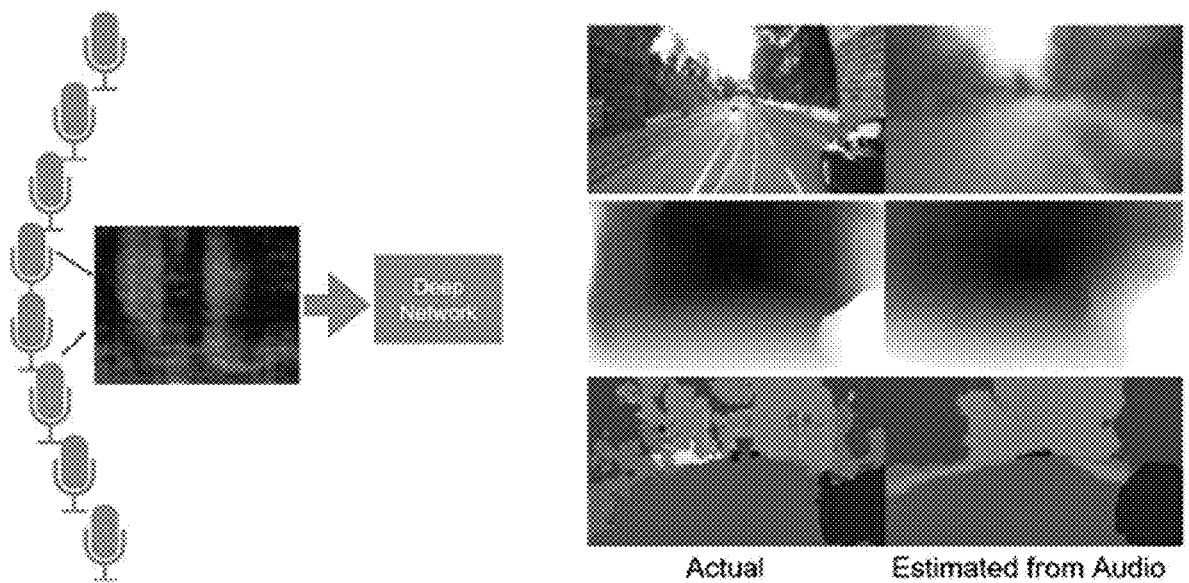
FIG. 12 shows example RGB, depth, and semantic segmentation images generated from audio data captured from an outdoor scene using the method in accordance with some example embodiments next to actual RGB, depth, and semantic segmentation images.

FIG. 12 shows additional the resulting RGB image, depth map, and semantic segmentation map using an outdoor YouTube ASMR dataset side-by-side with the visual images simultaneously captured with the audio samples.

As can be seen, the generation of visual images from audio data provides surprisingly satisfactory results.

The novel framework for generating visual images from audio data presented herein outperforms the current state-of-the-art frameworks for estimating depth maps and semantic segmentation maps from multi-channel audio. The fundamental idea behind the proposed method is learning the transformation between the audio and the visual domains at the visual manifold level obtained using a VQ-VAE rather than using an end-to-end training approach. It has been shown that this transformation is learnable and effective, and results in superior performance compared to previous approaches to this problem. As a result of the quantized nature of the VQ-VAE's manifold, the proposed method is more robust to errors and is able to generate more realistic images from audio only.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for generating a visual image from audio data, comprising:
   mapping audio data registered with a microphone array onto closest visual representations in a data manifold for latent representation of images of a visual modality, the data manifold being generated for encoding and decoding visual images; and
   generating a visual image of the visual modality from the closest visual representations.

2. The computer-implemented method of claim 1, wherein the data manifold forms part of a vector quantized variational auto-encoder (VQ-VAE) for the visual modality and the generating comprises generating the visual image using a visual decoder of the VQ-VAE.

3. The computer-implemented method of claim 1, wherein the closest visual representations are determined in terms of L2 norm.

4. The computer-implemented method of claim 1, wherein the mapping comprises encoding the audio data into a domain transformation MLP, and iteratively upsampling output of the domain transformation MLP.

5. A computing system for generating a visual images from audio data, the computing system comprising:
   a processor configured to:
      map audio data registered with a microphone array onto closest visual representations in a data manifold for latent representation of images of a visual modality, the data manifold being generated for encoding and decoding visual images; and
      generate a visual image of the visual modality from the closest visual representations.

6. The computing system of claim 5, wherein the data manifold forms part of a vector quantized variational auto-encoder (VQ-VAE) for the visual modality and the generating comprises generating the visual image using a visual decoder of the VQ-VAE.

7. The computing system of claim 5, wherein the closest visual representations are determined in terms of L2 norm.

8. The computing system of claim 5, wherein the processor is configured to encode the audio data into a domain transformation MLP, and iteratively upsample output of the domain transformation MLP.

9. A non-transitory machine-readable medium having tangibly stored thereon executable instructions for execution by one or more processors, wherein the executable instructions, in response to execution by the one or more processors, cause the one or more processors to:
   map audio data registered with a microphone array onto closest visual representations in a data manifold for latent representation of images of a visual modality, the data manifold being generated for encoding and decoding visual images; and
   generate a visual image of the visual modality from the closest visual representations.

10. A method for training an audio-visual transformation network for generating a visual image from audio data, comprising:

training a data manifold using a training set of visual images of a visual modality, the data manifold being generated for encoding and decoding visual images;

training a visual decoder for generating a visual image for data coded to the data manifold; and training an audio transformation network for mapping an audio sample to closest visual representations in the data manifold using a training set of audio samples corresponding to the training set of visual images, wherein the audio transformation network includes an audio encoder for encoding the audio sample into a domain transformation MLP, and a manifold decoder for iteratively upsampling output of the domain transformation MLP, wherein the manifold decoder comprises a series of strided transposed convolutional layers that upsample at each stage the output of the domain transformation MLP until a desired manifold size is achieved.

11. The method of claim 10, wherein the data manifold is a quantized latent representation of the training set of visual images.

12. The method of claim 11, wherein the data manifold forms part of a vector quantized variational auto-encoder (VQ-VAE) for the visual modality and the training of the visual decoder comprises generating the visual image using a visual decoder of the VQ-VAE.

13. The method of claim 10, wherein the closest visual representations are determined in terms of L2 norm.

14. A computing system for generating a visual images from audio data, the computing system comprising:
a processor configured to:
train a data manifold using a training set of visual images of a visual modality, the data manifold being generated for encoding and decoding visual images;
train a visual decoder for generating a visual image for data coded to the data manifold; and
train an audio transformation network for mapping an audio sample to closest visual representations in the data manifold using a training set of audio samples corresponding to the training set of visual images,
wherein the audio transformation network includes an audio encoder for encoding the audio sample into a domain transformation MLP, and a manifold decoder for iteratively upsampling output of the domain transformation MLP,
wherein the manifold decoder comprises a series of strided transposed convolutional layers that upsample at each stage the output of the domain transformation MLP until a desired manifold size is achieved.

15. The computing system of claim 14, wherein the data manifold is a quantized latent representation of the training set of visual images.

16. The computing system of claim 14, wherein the data manifold forms part of a vector quantized variational auto-encoder (VQ-VAE) for the visual modality and the training of the visual decoder comprises generating the visual image using a visual decoder of the VQ-VAE.

17. The computing system of claim 16, wherein the closest visual representations are determined in terms of L2 norm.

18. A non-transitory machine-readable medium having tangibly stored thereon executable instructions for execution by one or more processors, wherein the executable instructions, in response to execution by the one or more processors, cause the one or more processors to:
train a data manifold using a training set of visual images of a visual modality, the data manifold being generated for encoding and decoding visual images;
train a visual decoder for generating a visual image for data coded to the data manifold; and
train an audio transformation network for mapping an audio sample to closest visual representations in the data manifold using a training set of audio samples corresponding to the training set of visual images,
wherein the audio transformation network includes an audio encoder for encoding the audio sample into a domain transformation MLP, and a manifold decoder for iteratively upsampling output of the domain transformation MLP,
wherein the manifold decoder comprises a series of strided transposed convolutional layers that upsample at each stage the output of the domain transformation MLP until a desired manifold size is achieved.

* * * * *